(12) United States Patent
Smallhorn (10) Patent No.: US 8,173,902 B2
(45) Date of Patent: May 8, 2012

(54) SYSTEM FOR MOUNTING ELECTRICAL AND OPTICAL CONDUCTORS TO FLOOR BEAMS OF AN AIRCRAFT

(75) Inventor: George R. Smallhorn, St-Laurent (CA)

(73) Assignee: Inflight Investments Inc., St-Laurent (CA)

( * ) Notice: Subject to any disclaimer, the term of this patent is extended or adjusted under 35 U.S.C. 154(b) by 644 days.

(21) Appl. No.: 12/327,917

(22) Filed: Dec. 4, 2008

(65) Prior Publication Data
US 2010/0139948 A1    Jun. 10, 2010

(51) Int. Cl.
*H01B 7/00* (2006.01)
(52) U.S. Cl. ....... 174/135; 174/24; 174/72 A; 174/72 B; 174/88 B; 174/99 R; 211/193; 248/49; 248/63; 248/65; 248/68.1
(58) Field of Classification Search ............ 174/24, 174/72 A, 72 B, 88 B, 99 R, 135; 244/110 C; 211/193; 248/49, 63, 65, 68.1; *H01B 7/00*
See application file for complete search history.

(56) References Cited

U.S. PATENT DOCUMENTS

| | | | | |
|---|---|---|---|---|
| 2,963,539 A * | 12/1960 | Hynes | ...................... | 174/138 J |
| 4,676,036 A * | 6/1987 | Bessert | ...................... | 52/126.6 |
| 4,775,121 A * | 10/1988 | Carty | ........................ | 248/68.1 |
| 5,271,585 A * | 12/1993 | Zetena, Jr. | ...................... | 248/49 |
| 5,548,932 A * | 8/1996 | Mead | ............................ | 52/126.6 |
| 5,828,006 A * | 10/1998 | Graham et al. | ............... | 174/99 R |
| 6,672,022 B2 * | 1/2004 | Simmons | ........................ | 52/263 |
| 6,743,976 B2 * | 6/2004 | Motzigkeit | .................... | 174/486 |
| 7,246,527 B2 * | 7/2007 | Ostgaard et al. | ............... | 73/802 |
| 7,770,344 B2 * | 8/2010 | Betz | .............................. | 52/263 |
| 2005/0247820 A1 * | 11/2005 | Feist et al. | ................ | 244/118.6 |
| 2005/0258676 A1 * | 11/2005 | Mitchell et al. | .......... | 297/216.13 |
| 2006/0046582 A1 * | 3/2006 | MacKness | ..................... | 439/858 |
| 2006/0097109 A1 * | 5/2006 | Laib et al. | .................. | 244/118.6 |
| 2006/0102784 A1 * | 5/2006 | Callahan et al. | ........... | 244/118.6 |
| 2006/0202084 A1 * | 9/2006 | Smallhorn | ................... | 244/118.5 |
| 2007/0018045 A1 * | 1/2007 | Callahan et al. | ........... | 244/118.6 |
| 2010/0139948 A1 * | 6/2010 | Smallhorn | ..................... | 174/135 |

* cited by examiner

*Primary Examiner* — John K Kim
(74) *Attorney, Agent, or Firm* — Norton Rose Canada LLP; Paul J. Field (57) ABSTRACT

A system for mounting conductors, such as electrical wires, optical fiber cables, conduits and the like, to the floor beams of an aircraft cabin floor, having: an elongate raceway a longitudinal routing rails spanning between adjacent pairs of floor beams, each routing rail having an interior channel for housing conductors; conductor cradle blocks disposed in the interior channel, each cradle block including a mounting cushion adapted to engage a bottom portion of said conductors; and rail support brackets, each rail support bracket removably clamped on at least one of: the top flange; the bottom flange; and the web of a beam and removably mounted to the rail ends.

17 Claims, 7 Drawing Sheets

SYSTEM FOR MOUNTING ELECTRICAL AND OPTICAL CONDUCTORS TO FLOOR BEAMS OF AN AIRCRAFT

TECHNICAL FIELD

The invention relates to a system for mounting conductors such as electrical wires, optical fibre cables, conduits and the like to the floor beams of an aircraft cabin floor without modifying or altering the floor beams.

BACKGROUND OF THE ART

In the passenger cabins of aircraft an increasingly important component is the provision of passenger entertainment systems, mobile telephone services, laptop power and computer communications connectivity. To improve service, airlines are retrofitting existing aircraft and ordering newly built aircraft with audio and video entertainment on demand, telephone, intercom, television, video games, internet, email and electrical power supply for laptop computers, especially in business class and first class areas to permit passengers to work during the flight, communicate or seek entertainment.

One way of installing equipment and wiring for such systems is to disengage floor panels from the beams supporting the passenger cabin floor. The wiring is run between passenger seats and various computer servers or other electronic equipment under the floor panels. After installation the floor panels are reattached to the floor beams.

A particular concern with installing equipment in an aircraft is that any modification to the aircraft structure could weaken the structure or introduce stress concentrations that lead to metal fatigue and crack propagation. Therefore when installing new equipment in an existing aircraft, drilling holes in floor beams to mount wiring and equipment requires approval from government regulatory inspectors, requires a high degree of accuracy and is generally not preferred for these reasons which add cost and delay. Future aircraft will have carbon fibre structural members as opposed to aluminium sections now used. Therefore in the future modification of carbon fibre members will be prohibited or severely restricted to avoid irreparable damage to delicate carbon fibre materials.

In a newly built aircraft the manufacturer can provide for mounting brackets and holes in floor beams as part of the original design of the aircraft structure. However such designs do not provide for flexibility in relocating wiring or equipment, during manufacturing or afterwards during the service life of the aircraft.

Accordingly it is desirable to have cable raceways, mounting brackets for wires, cables, conduits and the like that can be attached and removed from aircraft floor beams without modifying the floor beams in any way.

It is further desirable that such mounting systems be low cost, be of standard or universal design and be as lightweight as possible for an aircraft application. Features that distinguish the present invention from the background art will be apparent from review of the disclosure, drawings and description of the invention presented below.

DISCLOSURE OF THE INVENTION

The invention provides a system for mounting conductors, such as electrical wires, optical fibre cables, conduits and the like, to the floor beams of an aircraft cabin floor, having: an elongate raceway a longitudinal routing rails spanning between adjacent pairs of floor beams, each routing rail having an interior channel for housing conductors; conductor cradle blocks disposed in the interior channel, each cradle block including a mounting cushion adapted to engage a bottom portion of said conductors; and rail support brackets, each rail support bracket removably clamped on at least one of: the top flange; the bottom flange; and the web of a beam and removably mounted to the rail ends.

DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION OF PREFERRED EMBODIMENTS

The invention provides a system for mounting conductors using modular interchangeable components that can be attached and removed from the beams of an aircraft cabin floor without damage of modification to the beams. As is well known to those skilled in the art, modification to aircraft structures is strictly regulated and any modifications must be approved since drilling holes or cutting flanges in beams for example weakens the structure and exposes the beams to fatigue crack formation or other structural failure.

Figure 1:
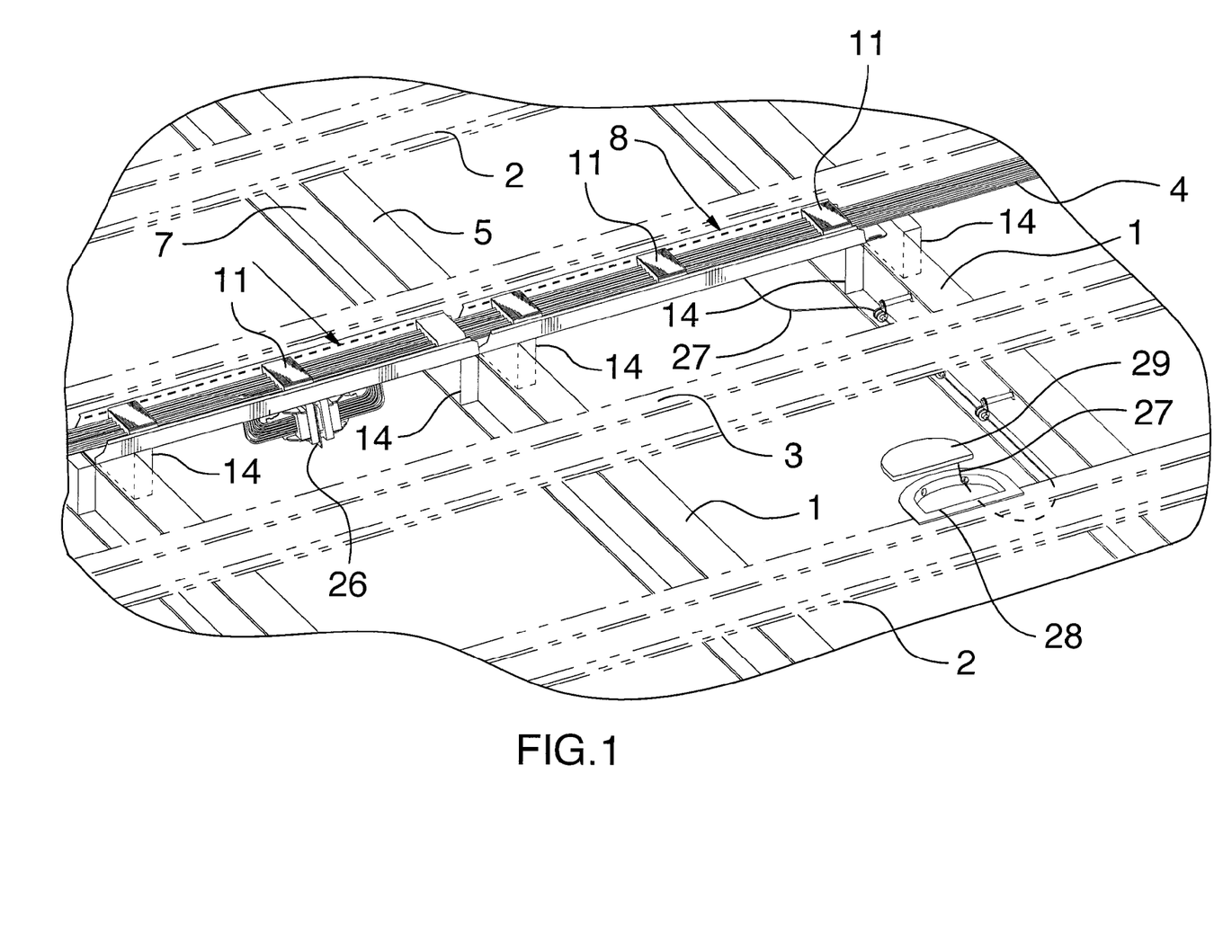
FIG. 1 is a top isometric view of a floor beam structure showing a raceway with a longitudinal series of routing rails holding conductors in cradle blocks and showing a single conductor to the right extending to a recessed housing in a floor panel adjacent a passenger seat.

FIG. 1 one shows a top isometric view of a floor beam structure which is typical to the cabin floors of aircrafts as follows. The outer shell of an aircraft structure is usually tubular in shape having transversely spanning floor beams which span between two lateral sides of a hoop or rim beam (not shown) which gives a circular or oval shape to the aircraft. The floors beams 1 divide the upper cabin from the lower cargo space in general.

Running longitudinally and at right angles to the floor beams 1 are longitudinal beams 2 with a seat track 3 in the upper flange surface to which passenger seats are mounted and secured. The specific structure of floor beams 1 and longitudinal beams 2 varies between manufacturers however since this structure is generally well known by those skilled in the art it is considered unnecessary to describe any further details. Typically, the floor beams 1 and the longitudinal beams 2 are generally aluminum extruded shapes such as i-beams???? or channel structures. Therefore, floor beams and longitudinal beams generally have a horizontal top flange and bottom flange as well as a vertical web.

The invention provides assistance for mounting conductors such as electrical wires optical fiber cables, conduits and the like. For simplicity in the drawings and description these conductors are identified simply as elongate conductors 4 and it will be understood that it can be metal or optical fibers without departing from the teachings of the invention. Referring to FIG. 1, each floor beam 1 has a top flange 5, bottom flange 6 and a web 7 extending between the flanges. In the embodiments shown in the drawings, the floor beam 1 is an I-beam however various other extruded shapes are within the contemplation of the invention such as C-shaped channels, J or Z-shaped extrusion profiles commonly used in structural design and aircraft fabrication.

The floor beams 1 are disposed in a substantially parallel spaced apart array and the longitudinal beams 2 with seat tracks 3 in the embodiment shown are disposed resting on the top flange 5 of the transverse floor beam 1. this arrangement is typical for Boeing aircraft for example. The aircraft cabin floor includes a plurality of removable floor panels (not shown) which are mounted to either the top flange of the longitudinal beams 4 or the top flanges of the floor beams 1.

Figure 2:
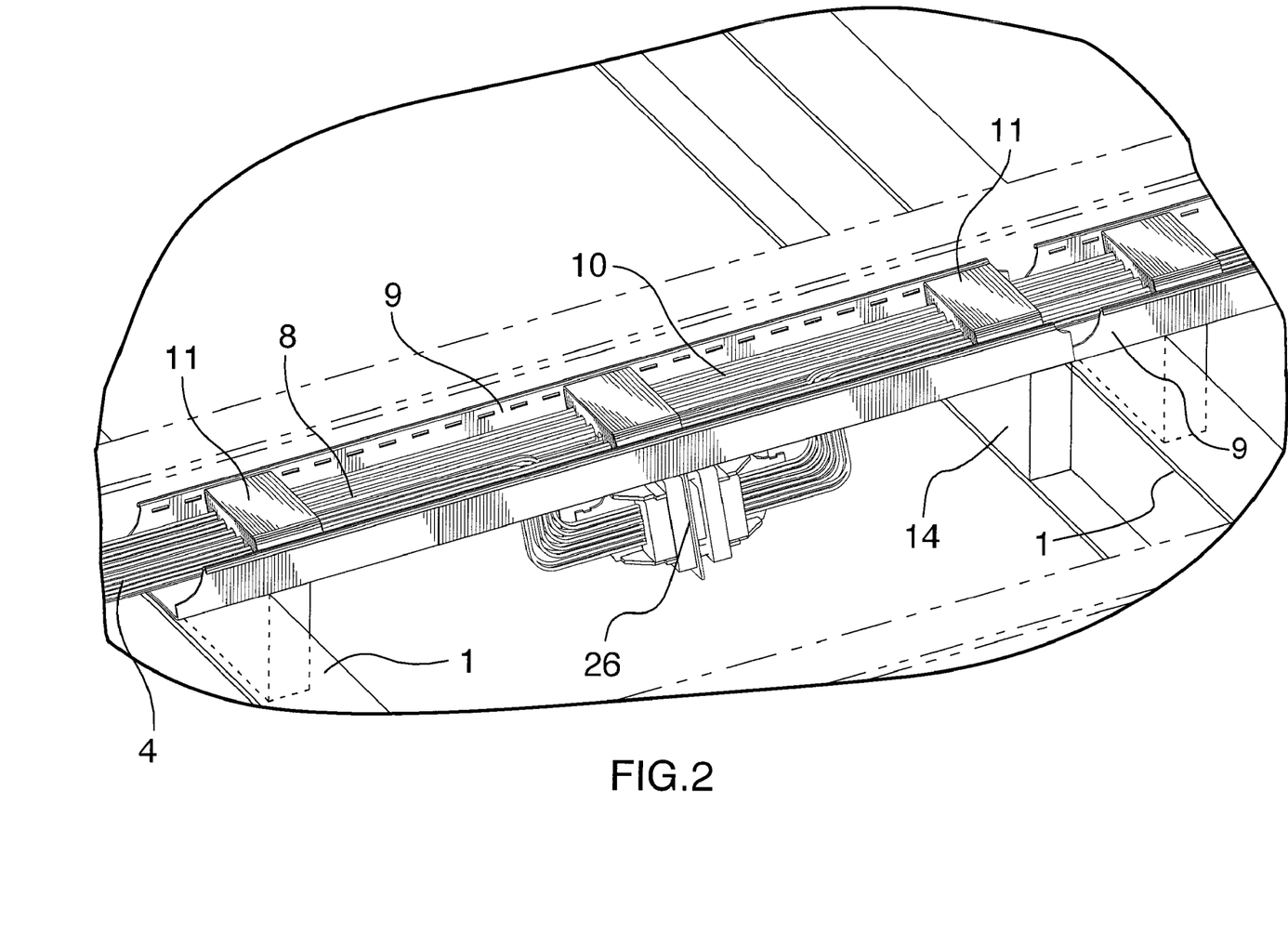
FIG. 2 is a detailed isometric view of the raceway, routing rails and cradle blocks of FIG. 1.
Figure 3:
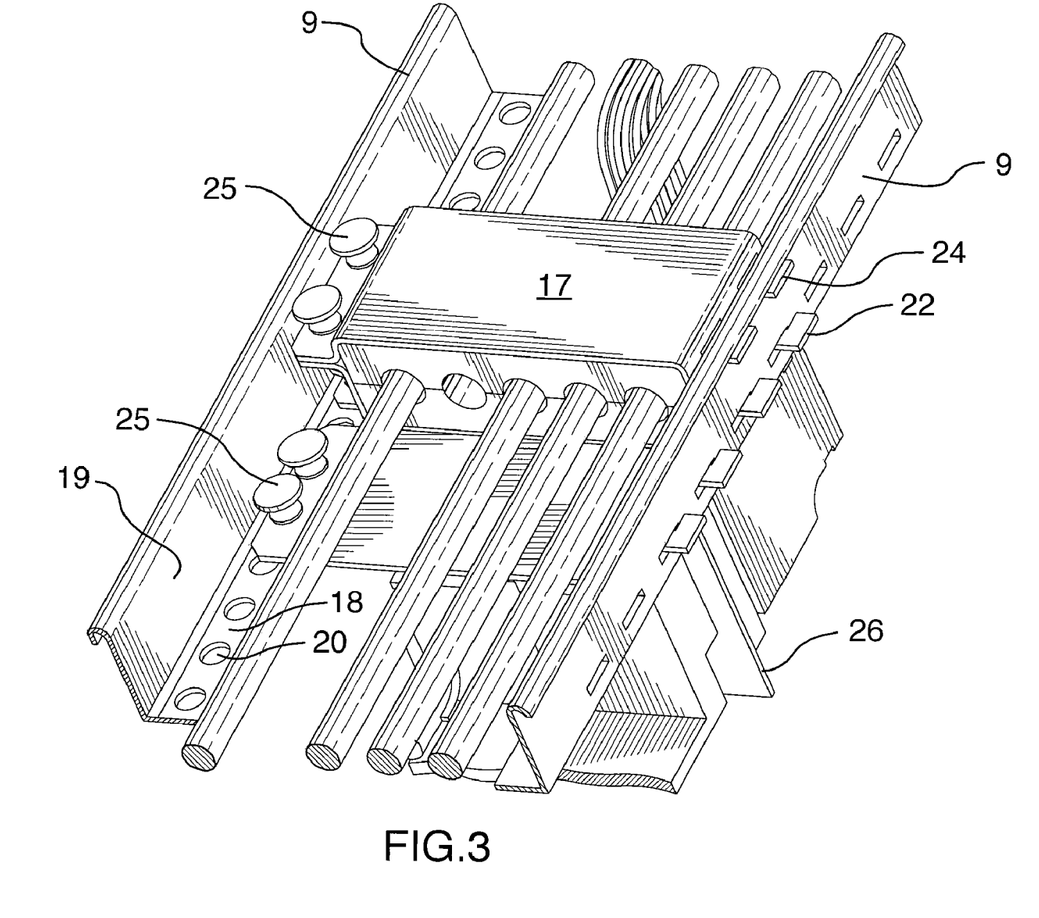
FIG. 3 is a detailed isometric view of a conductor cradle block, a securing block above the cradle block, an underhanging bracket and illustrating the means by which they are secured to the routing rail with rectangular hinge apertures and mating hinge projections, as well as circular locking apertures and mating barbed pins.
Figure 4:
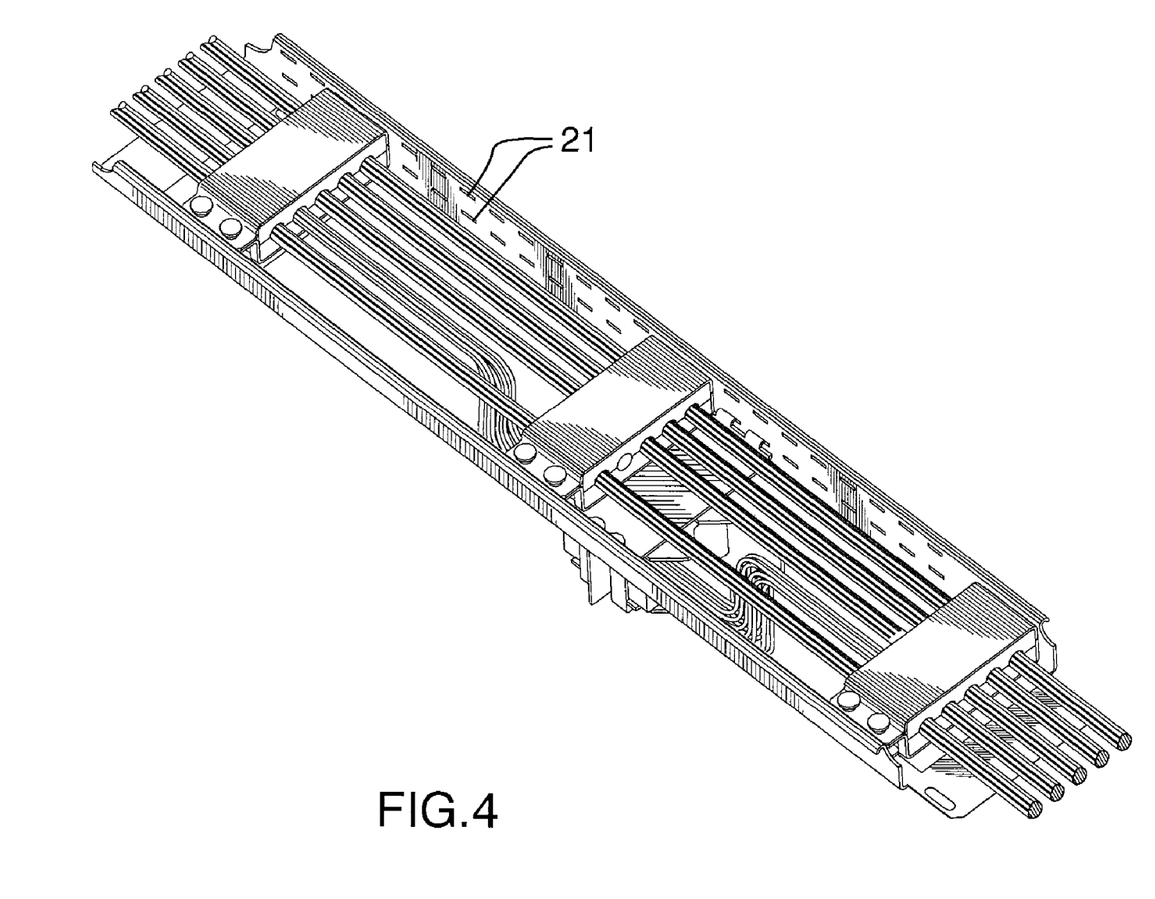
FIG. 4 is a detailed isometric view of one routing rail with three cradle blocks and an underhanging bracket with longitudinally running conductors.
Figure 5:
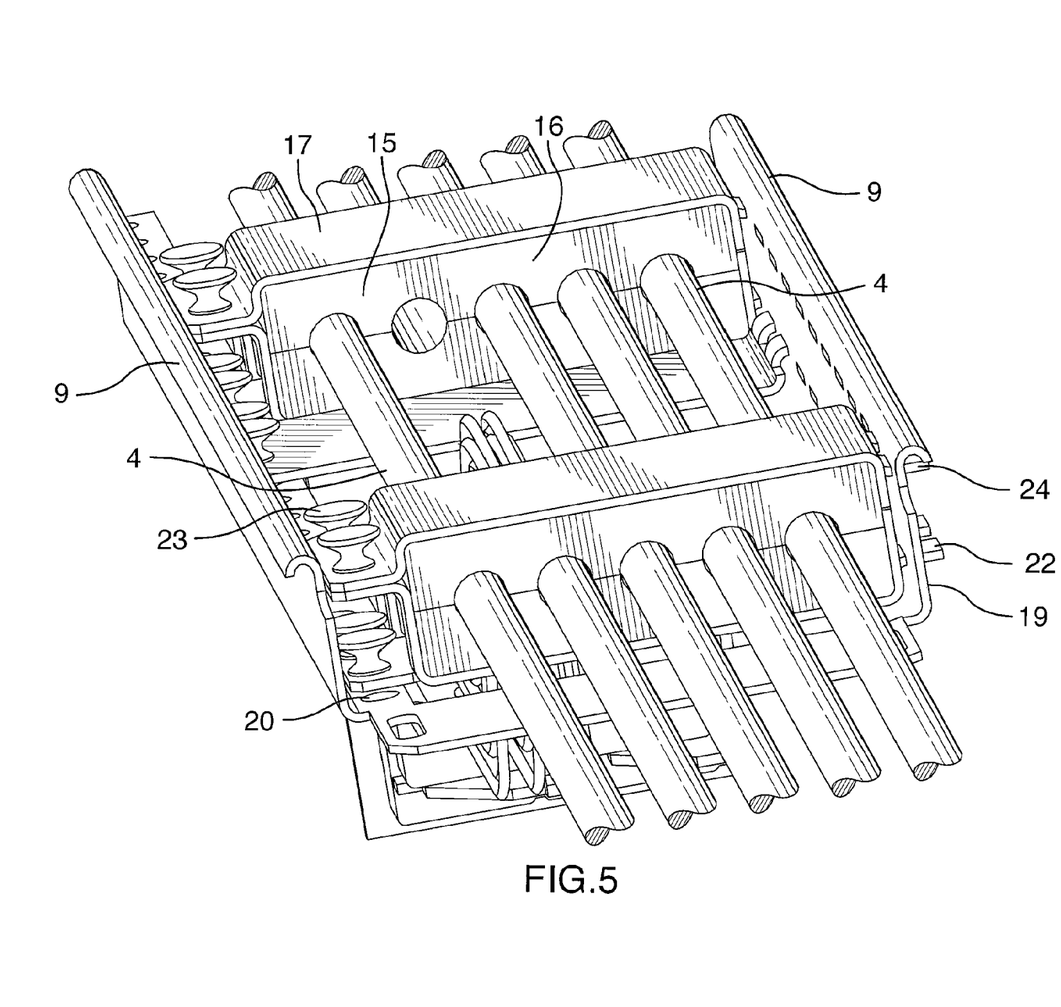
FIG. 5 is a further detailed view of the routing rail, cradle block and securing block.
Figure 6:
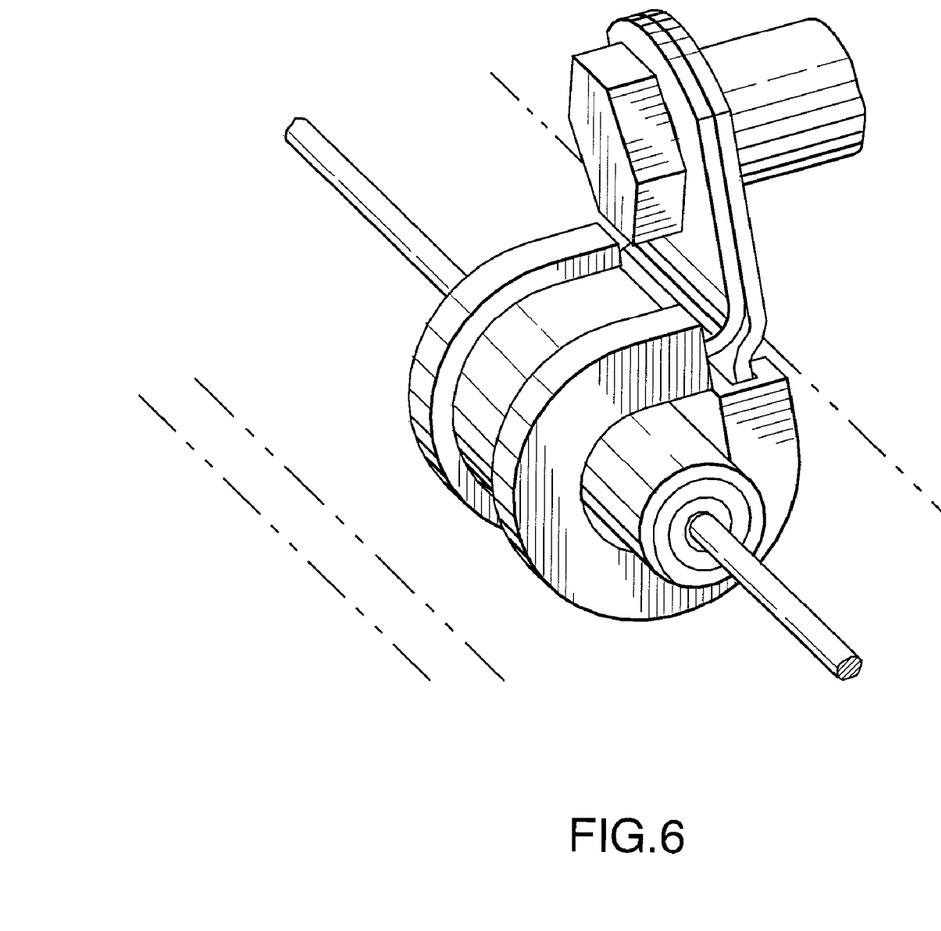
FIG. 6 shows a standoff bracket to support a single fibre optic cable.
Figure 7:
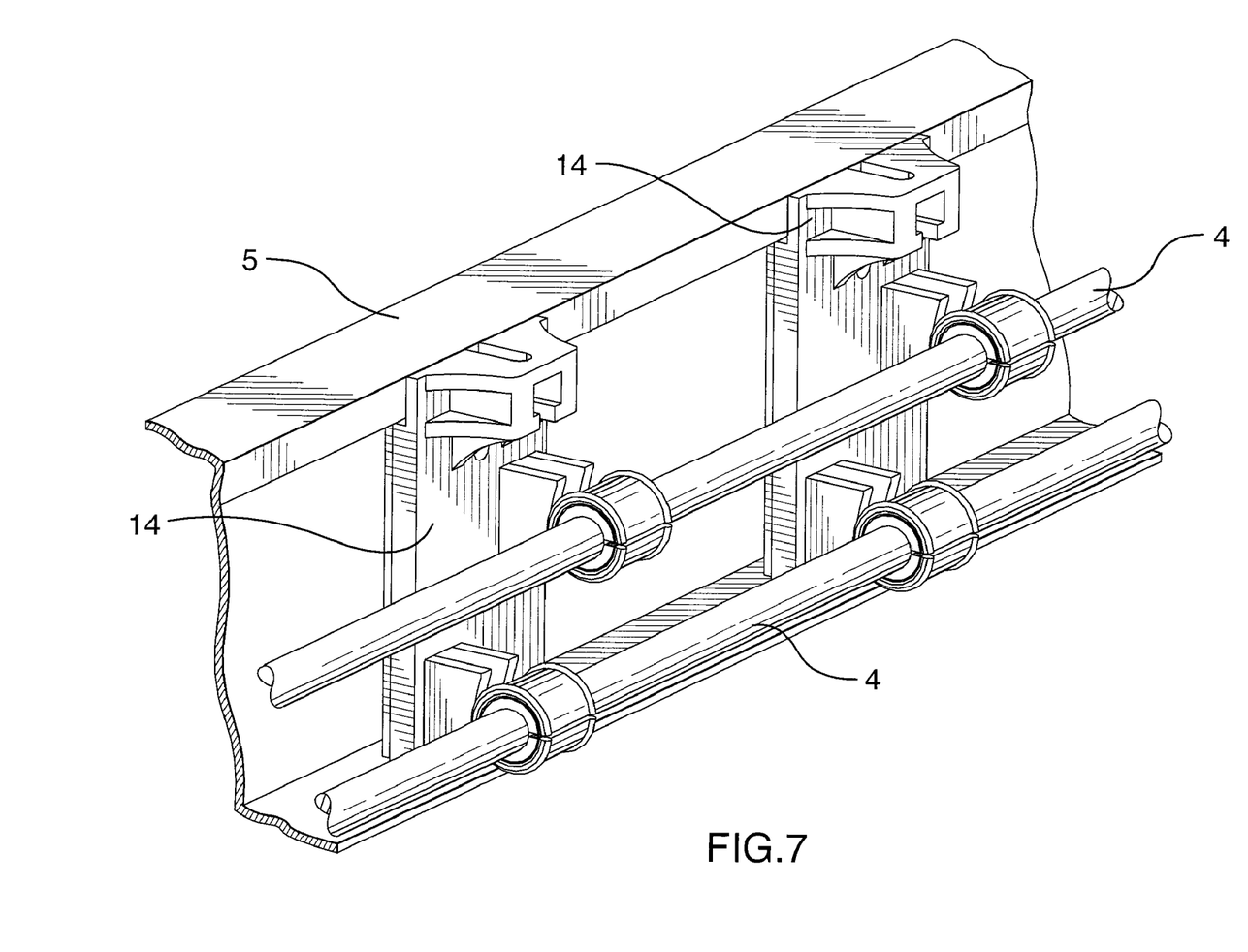
FIG. 7 shows a multiple cable support bracket which also supports the routing rail on a top surface.

The invention includes an elongate raceway 8, the details of which are better shown in FIG. 2 and details in FIGS. 3-5. The raceway 8 as shown in FIG. 2 is made up of modular longitudinal routing rails 9 which span between the floor beams 1. Each routing rail 9 has an interior channel 10 for housing the conductors 4 and each channel 10 has two open ends as illustrated at the longitudinal ends of the rails 9.

Within the interior channel 10 are a number of cradle blocks 11 best shown in FIG. 5. In the embodiment illustrated, the lower cradle block 11 has five semicircular longitudinal grooves within which conductors 4 can be rested. Each cradle block 11 includes a mounting cushion 12 and a surrounding metal frame 13 that contains the cushion 12. Each block 11 is mounted to the rails 9 in a manner described below.

Each rail 9 is fixed to removable rail support brackets 14. The rail support brackets 14 are clamped to the upper and lower flanges 5 and 6 of the floor beams 1 and in the example shown include screw holes in the top surface of the brackets 14 into which the rails 9 can be removably attached. A suitable rail support bracket 14 is described in the applicant's co-pending U.S. patent application Ser. No. 11/989,835, the teachings of which are incorporated hereby by reference. Each rail support bracket 14 is removably clamped on at least one of the top flange 5, the bottom flange 6 or the web 7 of the beams 1 and is removably mounted to the ends of the rail 9 with screws or other removable fasteners.

Therefore, an advantage of the invention is that the blocks 11 and brackets 14 are removably clamped and therefore do not damage or modify the floor beams 1. Further, the rails 9 and brackets 14 can be completely removed or relocated as desired when an aircraft cabin is reconfigured. This flexibility provides advantage to the airline and modular construction ensures that the components such as the rails 9 and brackets 14 are reusable.

As seen in FIGS. 1 and 2, the cradle blocks 11 are disposed in a longitudinally spaced apart array along the raceway 8. Depending on the stiffness of the conductors 4, any number of cradle blocks 11 can be positioned within the channel 10 to ensure that the conductors are not damaged by movement of the aircraft or vibrations of the floor structure.

As best seen in FIG. 5, the cradle blocks 11 are mated with upper securing blocks 15. Each securing block 15 also includes a mounting cushion 16 with a mating semicircular channel for each conductor 4 to clamp the conductors 4 between the resilient mounting cushions 12 and 16. This cushioning arrangement is advantageous in vibrating and moving vehicles such as aircraft relatively brittle optical fiber cables are used as conductors 4. The securing blocks 15 in addition to the cushions 16 include a supporting metal frame 17.

As best seen in FIG. 3, the rail 9 include a base wall 18 and at least one side wall 19 extending upwardly from the base wall 18. In the embodiment shown the base wall 18 includes circular apertures 20 and the side wall 19 includes rectangular apertures 21 disposed in an upper row and a lower row. FIG. 4 shows the best view of the rectangular apertures 21. FIG. 3 illustrates how the cradle block 11 includes rectangular projections 22 that are inserted into the longitudinally spaced apart rectangular apertures 21 to support the cradle block.

FIG. 5 shows the rectangular projections 22 inserted through the side wall 19 of the rail 9 and also shows releasable locking pins 23 which are inserted into the circular apertures 20.

The routing rails 9 include cradle mounting apertures 20 and 21. The rectangular apertures 21 provide a sufficient degree of hinging action. The rectangular projections 22 are inserted into the rectangular apertures 21, the cradle block 11 is rotated downwardly and the circular apertures 20 lock the cradle 11 to the rails 9 with releasable locking pins 23 inserted into circular apertures 20. In a like manner, the rail 9 includes rectangular securing apertures 21 which provide a hinging aperture into which rectangular tabs 24 of the securing block frame 17 are inserted. Releasable locking pins 25 secure the metal frame 17 of the securing block 15 to the metal frame 13 of the cradle block 11.

To install the cradle block 11 and the securing block 15 the following procedure is carried out. Once the rails 9 are in position, the tabs 22 of the lower cradle block frame 13 are inserted into rectangular apertures 21 and the frame 13 is hinged into position to then be secured with locking pins 23 into circular apertures 20. Then conductors 24 can be laid into the semi-circular grooves in the cushions 12. Once all conductors 4 are inserted, the cushions 16 of the upper securing blocks 15 can be positioned together with the metal frames 17 of the securing blocks 15. In a like manner, the rectangular tabs 24 of the securing block frame 17 are inserted into rectangular apertures 21 and hinged downwardly until the locking pins 25 can be inserted in aligned apertures provided between the metal frames 13 and 17.

As shown in FIGS. 1 and 2 and in detail in FIG. 3, the rails 9 can also support an under hanging bracket 26 also removably mounted to the underside of the routing rails 9 in a similar manner.

As seen in FIG. 3 the under hanging bracket 26 includes rectangular projections 22 and locking pins 25 which are mounted into the circular apertures 20 and rectangular apertures 21 as described below. In the like manner, the underhanging bracket 26 includes hinged rectangular tabs 22 which are inserted into the rectangular hinging apertures 21. The bracket 26 also includes locking circular apertures 20 and releasable locking pins 25 inserted therein. The under-hanging brackets 26 can be used for supporting connectors that join the conductors 4, the brackets 26 can support conductor slicing connectors or an electronic circuit board. In the drawings, the brackets 26 are depicted as a simple block. However, it will be understood that any electronic connectors or equipment can be supported on the brackets 26.

The rails 9, the cradle blocks 11, the securing blocks 15 and the brackets 26 can be made of metal with appropriate insulation or absorbent mountings for preventing electrical conduction or propagating of vibration. Further, these components may be of a molded plastic that has electrical insulation properties.

As shown in FIG. 1, individual wires 27 may project through the floor panels (not shown) through a recessed conductor passage 28. In the embodiment shown the passage 28 is a recess cap which can include a cap 29 that is removable and provides a flush floor surface. The cap 29 and passage housing 28 can be mounted within floor board and provides ample space for housing the wires 27 which generally will be deployed to connections with wires extending from passenger seats. The passage housing 28 can be spaced at regular intervals to service each seat as desired. It will be understood that the wire 27 is generally a flexible conductor and can be coiled to be housed within a recess housing 28.

Although the above description relates to a specific preferred embodiment as presently contemplated by the inventor, it will be understood that the invention in its broad aspect includes mechanical and functional equivalents of the elements described herein.

I claim:

1. A system for mounting conductors, such as electrical wires, optical fiber cables, conduits and the like, to the floor beams of an aircraft cabin floor, each floor beam having a top flange, a bottom flange and a web extending between the flanges, the floor beams being disposed in a substantially parallel spaced apart array, the floor including a plurality of removable floor panels mounted on said floor beams, the system comprising:
   an elongate raceway disposed below the removable floor panels, the raceway comprised of a plurality of longitudinal routing rails spanning between adjacent pairs of said floor beams, each routing rail having an interior channel for housing said conductors and having two open ends;
   a plurality of conductor cradle blocks disposed in said interior channel, each cradle block including a mounting cushion adapted to engage a bottom portion of said conductors; and
   a plurality of rail support brackets, each rail support bracket removably clamped on at least one of: the top flange; the bottom flange; and the web of one of said beams and removably mounted to one of said rail ends.

2. A system according to claim 1 wherein the cradle blocks are disposed in a longitudinally spaced apart array along the raceway.

3. A system according to claim 1 comprising a plurality of securing blocks mating said cradle blocks, each securing block including a mounting cushion adapted to engage a top portion of said conductors.

4. A system according to claim 1 wherein each routing rail has at least one base wall and at least one side wall extending upwardly from the base wall.

5. A system according to claim 1 wherein each routing rail has a plurality of longitudinally spaced apart cradle apertures and each cradle block includes mounting projections mating said cradle apertures.

6. A system according to claim 5 wherein each routing rail has a plurality of longitudinally spaced apart securing apertures and each securing block includes mounting projections mating said securing apertures.

7. A system according to claim 1 including at least one underhanging bracket removably mounted to an underside of said routing rail.

8. A system according to claim 7 wherein each routing rail has a plurality of longitudinally spaced apart mounting apertures and each underhanging bracket includes mounting projections mating said mounting apertures.

9. A system according to claim 8 wherein the underhanging brackets are adapted to support at least one of: a conductor joining connector; a conductor splicing connector; and electronic circuitboard.

10. A system according to claim 1 including at least one said floor panel with a conductor passage therethrough.

11. A system according to claim 1 wherein said at least one floor panel includes a flexible conductor recessed housing adjacent said conductor passage.

12. A system according to claim 11 wherein said housing includes a removable cap.

13. A system according to claim 5 wherein said cradle apertures in the routing rail include a hinging aperture and a locking aperture and the mounting projections on said cradle block include a hinge tab and a releasable locking pin.

14. A system according to claim 6 wherein said securing apertures in the routing rail include a hinging aperture and a locking aperture and the securing projections on said securing block include a hinge tab and a releasable locking pin.

15. A system according to claim 8 wherein said securing apertures in the routing rail include a hinging aperture and a locking aperture and the mounting projections on said underhanging bracket include a hinge tab and a releasable locking pin.

16. A system according to claim 1 wherein at least one of: said routing rails; said conductor cradle blocks; and said rail support brackets includes electrical insulation.

17. A system according to claim 16 wherein at least one of: said routing rails; said conductor cradle blocks; and said rail support brackets comprises a moulded plastic structure having electrical insulation properties.

* * * * *